United States Patent [19]

Sofer et al.

[11] Patent Number: 5,489,896
[45] Date of Patent: Feb. 6, 1996

[54] NETWORK WITH A SECURITY CAPABILITY

[75] Inventors: Dror Sofer, Tel Aviv; Benjamin Hanigal, Netanya; Amnon Sadan, Rishon Lezion, all of Israel

[73] Assignee: Lannet Data Communications Ltd., Tel Aviv, Israel

[21] Appl. No.: 16,883

[22] Filed: Feb. 12, 1993

[30] Foreign Application Priority Data

Oct. 18, 1992 [IL] Israel ........................................ 103467

[51] Int. Cl.$^6$ ................................................ H04L 12/22
[52] U.S. Cl. ..................... 340/825.05; 340/825.3
[58] Field of Search .................. 340/825.52, 825.5, 340/825.31, 825.05, 825.30; 370/85.15, 85.5; 380/25

[56] References Cited

U.S. PATENT DOCUMENTS

| | | | |
|---|---|---|---|
| 4,672,572 | 6/1987 | Alsberg ............................... | 380/25 |
| 4,876,717 | 10/1989 | Barron et al. . | |
| 4,901,348 | 12/1990 | Nichols et al. ...................... | 380/6 |
| 4,930,159 | 5/1990 | Kravitz et al. ...................... | 340/825.52 |
| 5,161,192 | 11/1992 | Carter et al. ........................ | 300/48 |

FOREIGN PATENT DOCUMENTS 0431751 12/1991 European Pat. Off. .

OTHER PUBLICATIONS

Elektronik, vol. 38, No. 17, Aug. 1989, Munchen De. Schwaiger et al, "Die Vielfalt der Daten Bundeln". pp. 93–96.
Andrew S. Tanenbaum, *Computer Networks*, 1981 American National Standard, Physical Signaling, Medium Attachment, and Baseband Medium Specifications Type 1BASE5 (Section 12), Approved Jun. 11, 1987.
Donald E. Knuth, *The ARt of Computer Programming*, 1973.
LAN dispatch; Spring 1991; pp. 24–28 an AT&T publication.

*Primary Examiner*—Michael Horabik
*Attorney, Agent, or Firm*—Sixbey, Friedman, Leedom & Ferguson; David S. Safran

[57] ABSTRACT

A network having a security capability where the network includes a data bus, a plurality of stations connected to the data bus and a security unit which monitors traffic on the data bus and only enables authorized data to flow along the data bus.

22 Claims, 3 Drawing Sheets

5,489,896

NETWORK WITH A SECURITY CAPABILITY

FIELD OF THE INVENTION

The present invention relates to local area networks generally and to apparatus for reducing unauthorized access to and sessions on such networks in particular.

BACKGROUND OF THE INVENTION

Local area networks (LANs), such as carrier sense, ring and shared-media networks, are very common. Typically, they are found within a corporation or a university or among a number of closely located sites.

The type of LAN determines how the elements of the LAN are connected together. A typical carrier sense multiple access LAN is shown in FIG. 1. It includes a hub 10 to which are attached a plurality of stations 12, such as mainframe computers, workstations and personal computers. The hub 10 typically controls the communication between the stations 12 and includes in it a data bus along which messages are sent. Thus, if station 12a wants to send a message to station 12b, it first sends the message to hub 10 which provides the message to the data bus. In a carrier sense network, only the destination station, station 12b, can process the message.

Each type of network typically includes a number of layers of communication. For example, according to the Reference Model of Open Systems Interconnection (OSI), there are the following seven layers: physical, data link, network, transport, session, presentation and application.

As is known in the art, the physical layer is the elements which provide the physical interconnection of the stations 12 and the hub 10. It simply sends and receives digital data.

The data link layer, or medium access control (MAC) layer, removes any noisy data, retransmits poorly received data and breaks the digital data received by the physical layer into packets of data for later processing by the higher layers. The packets of data typically include physical source and destination addresses as well as the logical source (or user) and destination information and the message being sent.

The network layer determines the routing of packets of data between stations. The other, higher, layers provide direct communication between the physical source and destination as well as the logical source and destination. The headers and control information which form part of messages on the network are utilized, in the higher layers, to determine the destination station and the user, the final destination, who has an account on the destination station.

A full description of network communication can be found in the book *Computer Networks* by Andrew S. Tanenbaum, Prentice-Hall, Inc. Englewood Cliffs, N.J., 1981.

It is known that a network can be accessed by an unauthorized user. Networks and individual stations 12 typically reduce this problem by requiring that each user be identified by a user name and a password. The sophistication of the user name and password depend on the level of security required. However, an unauthorized user can breach the security if he can connect his computer to the network and if he knows, or can guess, the username and password of another user. This type of security is known as "end user" security.

Since data freely move about the data bus of the network, anyone who can access the data bus can process the data to read the messages. A network analyzer 14 is one apparatus which can process network data. It can be utilized to determine if any unauthorized users attempted to access the network. If an unauthorized user is found, he can be shut off from the network. However, since the analysis operation is performed after the messages are sent on the network (i.e. off-line), the unauthorized user cannot be shut down as soon as he begins to operate. Thus, the unauthorized user has a window of at least several seconds to operate.

European Patent Publication 431,751-A1 describes a multiport repeater for a LAN. It operates to ensure that only designated receivers receive their messages. In effect, it ensures that the network analyzer 14 can not "eavesdrop" on the data moving about the data bus. To do this, Publication 431,751-A1 corrupts each message for all destinations except the designated destination.

Despite many attempts to tighten network security, it is still a widespread problem.

SUMMARY OF THE INVENTION

It is therefore an object of the present invention to provide an apparatus and method for improved LAN security.

There is therefore provided, in accordance with a preferred embodiment of the present invention, a network having a security capability where the network includes a) a data bus, b) a plurality of stations connected to the data bus and c) a security unit which monitors traffic on the data bus and only enables authorized data to flow along the data bus.

There is also provided, in accordance with a preferred embodiment of the present invention, a security unit for a network having a data bus to which a plurality of stations can be connected wherein the security unit monitors traffic on the data bus and only enables authorized data to flow along the data bus.

Additionally, in accordance with a preferred embodiment of the present invention, the data bus and the security unit are part of a hub.

Furthermore, in accordance with a preferred embodiment of the present invention, the network is a local area network (LAN). Preferably, the network is a carrier sensing multiple access/collision detection type of LAN.

Still further, in accordance with a preferred embodiment of the present invention, the security unit includes a packet blocker operating in accordance with a protocol of the network and operative when unauthorized communication is requested.

Moreover, in accordance with a preferred embodiment of the present invention, the traffic includes a multiplicity of data packets each having source and destination addresses and the security unit includes a plurality of correlators for determining that the source and destination addresses indicate an authorized communication.

Additionally, in accordance with a preferred embodiment of the present invention, each station is connected to the data bus via a port having a port address and one of the correlators correlates the source address with an authorized port address.

There is also provided, in accordance with a preferred embodiment of the present invention, a method of securing a network having at least one hub, the method including the steps of a) for every piece of data sent on a data bus of the hub, wherein the piece of data includes at least source and destination station addresses, determining if said addresses conform to a stored set of access rules, and b) if the output of the step of determining is false, sending a jam signal on the data bus and thereby causing a collision on the network.

Finally, in accordance with a preferred embodiment of the present invention, the access rules include at least one of the following rules: that the source station address be among a list of authorized source station addresses, that the source station be physically connected to an authorized port address and/or that the destination station address be in a list of authorized destination station addresses for the source station address.

BRIEF DESCRIPTION OF THE DRAWINGS

The present invention will be understood and appreciated more fully from the following detailed description taken in conjunction with the drawings in which.

DETAILED DESCRIPTION OF PRESENT INVENTION

Figure 1:
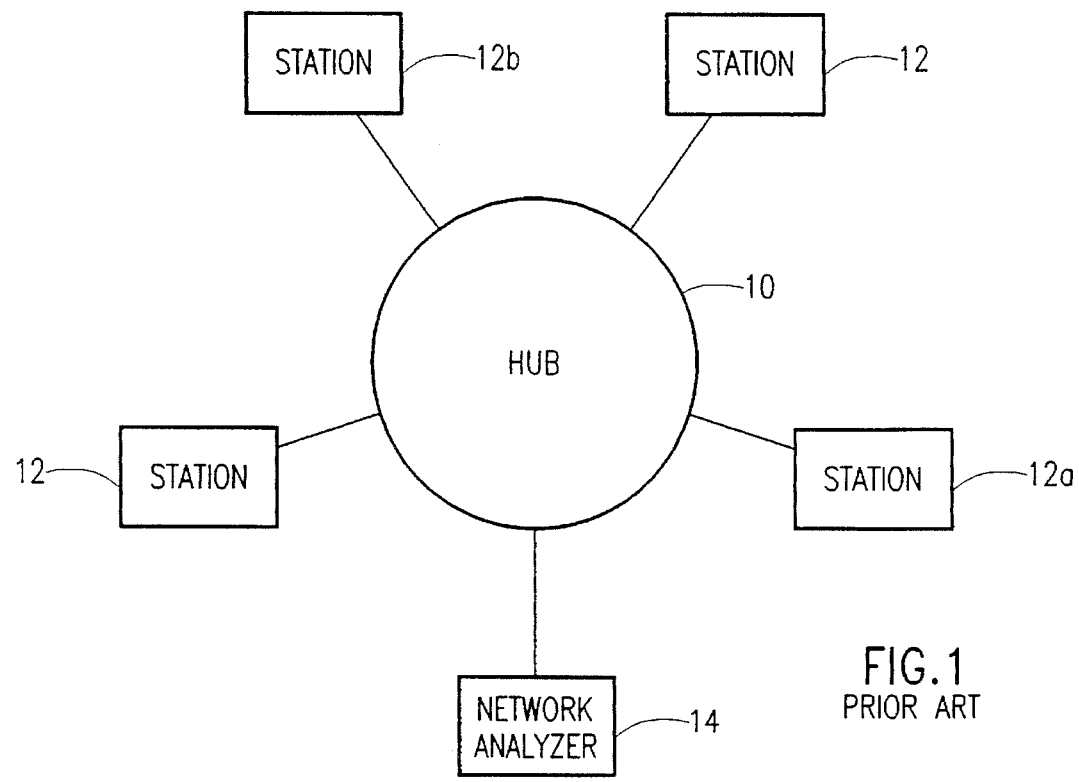
FIG. 1 is a schematic illustration of a prior art carrier sense LAN network arrangement.
Figure 2:
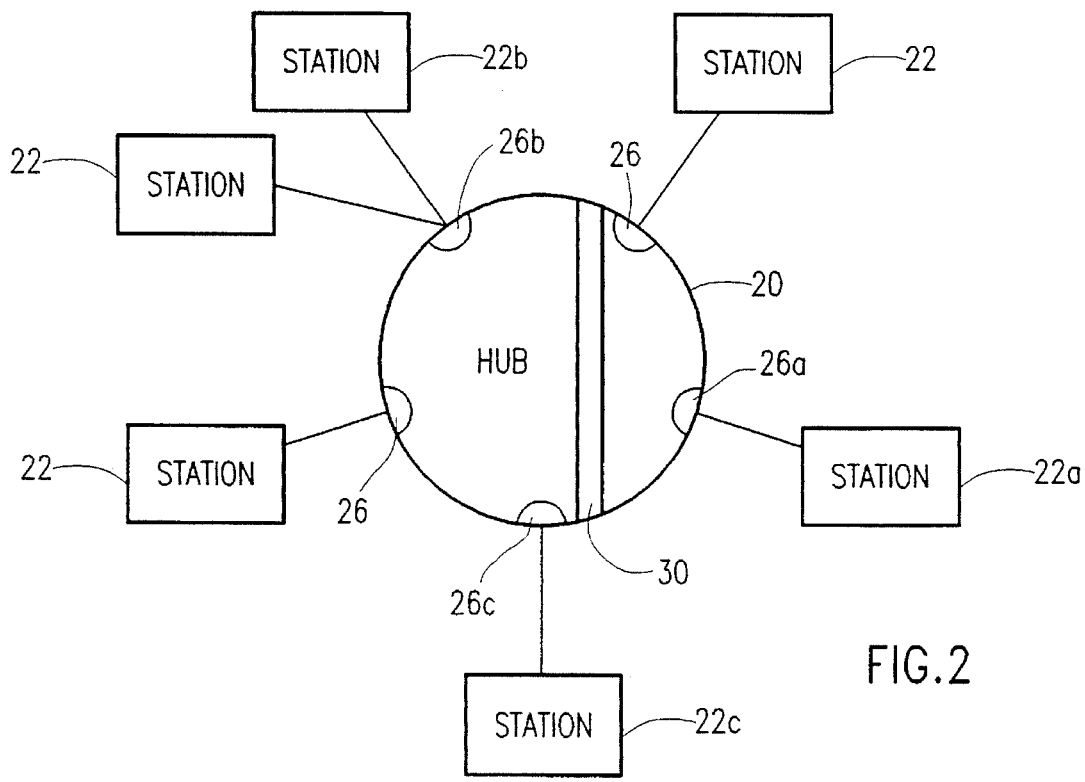
FIG. 2 is a schematic illustration of a carrier sense LAN network arrangement including a network security unit, constructed and operative in accordance with a preferred embodiment of the present invention.
Figure 3:
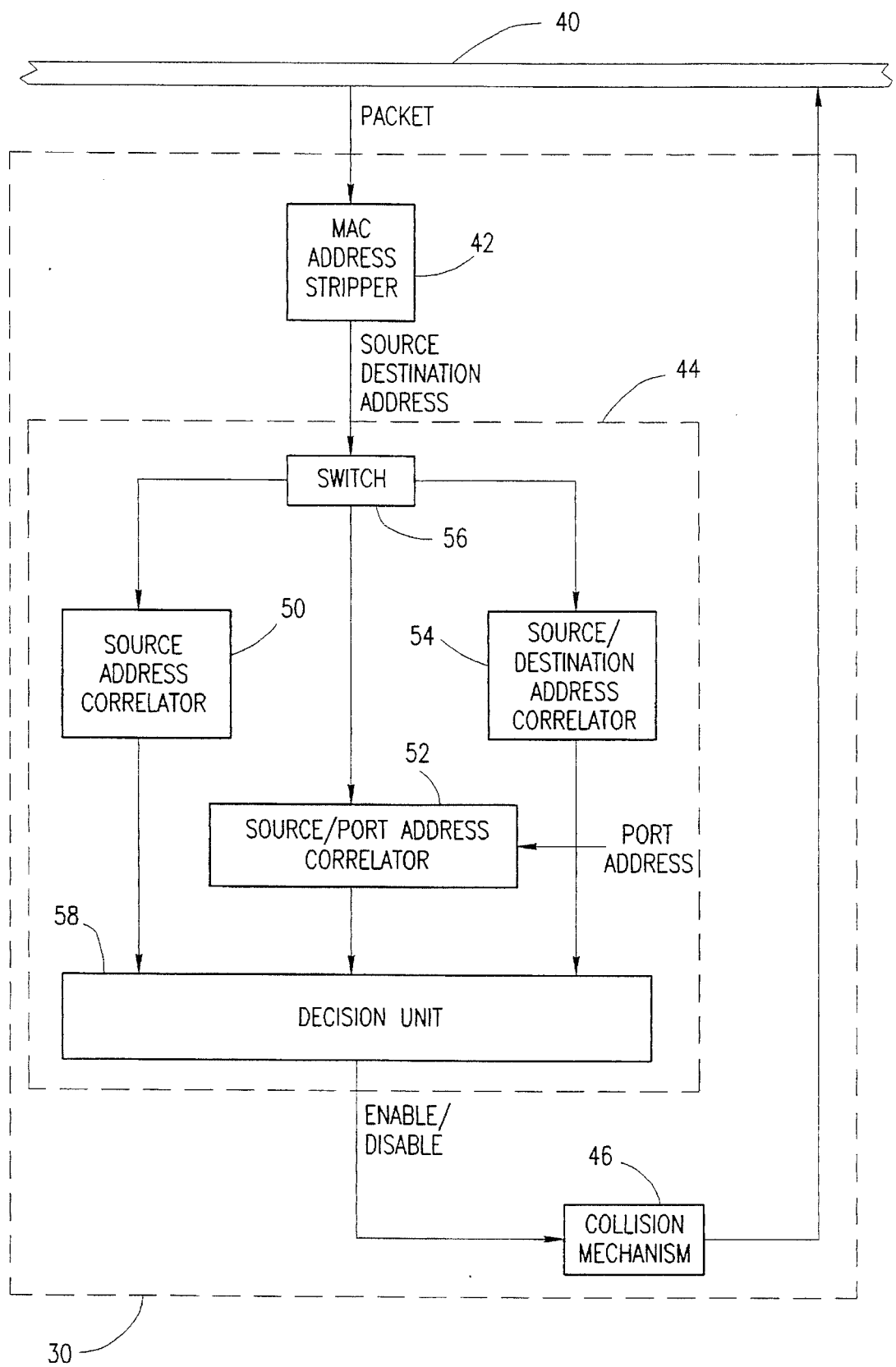
FIG. 3 is a block diagram illustration of the elements of the network security unit of FIG. 2.

Reference is now made to FIGS. 2 and 3 which respectively illustrate a network having the network security unit 30 of the present invention and the elements of security unit 30. As shown in FIG. 1, the network is a carrier sensing, multiple access/collision detection and comprises a hub 20, such as the LET 36 manufactured by Lannet Data Communication Ltd., Tel Aviv, Israel, and a plurality of stations 22. The network shown in FIG. 2 utilizes the Ethernet network protocol, detailed in IEEE standards 802.3, such as 10BaseT, 10BaseF, 10Base2, FOIRL, etc.

In the network of FIG. 2, the hub 20 additionally comprises a plurality of ports 26 to which are attached one or more stations 22.

Security unit 30 typically forms part of the hub 20 and, in accordance with the present invention, operates at the MAC layer. Security unit 30 can either be an integral part of hub 20, or as an add-on unit to it. Security unit 30 is operative to ensure that the stations 22 do not change their locations vis-a-vis the hub 20 and that only certain communication paths, (i.e. paths between certain stations 22) are enabled.

For example, let station 22a be located in an office of a manager, let station 22b contain in it the salary database, and let station 22c be located in an office of a programmer. In addition, let the manager be allowed to review the salary database, but not the programmer. If the security unit 30 detects a message from station 22c to station 22b, it will block that message. Furthermore, if the programmer physically moves his computer into the manager's office, (i.e. station 22c is now attached to port 26a), the security unit 30 will block any messages the programmer sends. Still further, any unauthorized stations 22 will not be allowed to send messages to any of the stations of the network.

The security unit 30 blocks messages sent by unauthorized stations or sent along unauthorized paths typically by utilizing the collision mechanism of the Ethernet protocol. As is known in the art, a collision on the network causes the sending station to stop transmission, for example in accordance with the IEEE 802.3 backoff algorithm.

Thus, in accordance with the present invention, the operation of the security unit 30 does not interfere with the proper operation of the network but rather, utilizes a standard mechanism to add security to the network.

The security unit 30 typically is connected, in parallel to a data bus 40 forming part of hub 20, and monitors data packets moving on the bus 40.

In the example of the Ethernet protocol, the unit 30 typically is formed from a Very Large Scale Integrated (VLSI) circuit chip and comprises a MAC address stripper 42 (FIG. 3), such as is known in the art, for removing the physical source and destination addresses (i.e. the station addresses) from a packet, an authorization unit 44 for determining whether or not the communication is authorized and a collision mechanism 46 for producing, on the data bus 40, a collision with the packet if not.

The authorization unit 44 typically comprises three correlators 50, 52 and 54, a mode switch 56 and a decision unit 58. Correlator 50 determines whether or not the source station address is among the authorized source stations. Correlator 52 determines whether or not the source station address is attached to its corresponding port, where the port address is provided from the hub 20, in the case of the LET 36 hub. Correlator 54 determines whether or not the source station is allowed to communicate with the destination station.

Each of correlators 50–54 typically comprise a list of authorized relationships. Thus, correlator 50 has a list of authorized stations, correlator 52 has a list of source addresses and their corresponding port addresses and correlator 54 has a list of source addresses and their allowed destination addresses.

If any of the correlators 50–54 determine that an unauthorized communication is requested, they provide a disable signal to the decision unit 58.

The correlators 50–54 must operate within the standard collision window of the Ethernet protocol in order not to significantly shrink the network. Thus, they can perform any fast correlation operation, such as a tree search, or, if the number of elements to be searched is low, a simple comparison. Appropriate correlation techniques are described in detail in *The Art of Computer Programming: Vol. 3: Sorting and Searching* by Donald Knuth, Addison-Wesley, Reading, Mass. 1973, which book is incorporated herein by reference.

It will be appreciated that correlators 50–54 form part of the VLSI chip of unit 30 and therefore, operate relatively quickly.

In accordance with the desires of a user, mode switch 56 defines which of the correlators 50–54 are currently active. Those which are, operate in parallel. Typically, at least the source address correlator 50 is active.

If decision unit 58 receives at least one disable signal from the active correlators 50–54, it enables the collision mechanism 46 which outputs a jam signal to the data bus 40 and causes thereby a bus collision.

It will be appreciated that the security unit 30 operates in real-time and thus, must determine that a packet is unauthorized within the allotted time period.

It is noted that the security unit 30 limits the size of the LAN due to the length of time it takes to operate. Thus, the security unit 30 should be designed to operate as quickly as possible.

Figure 4:
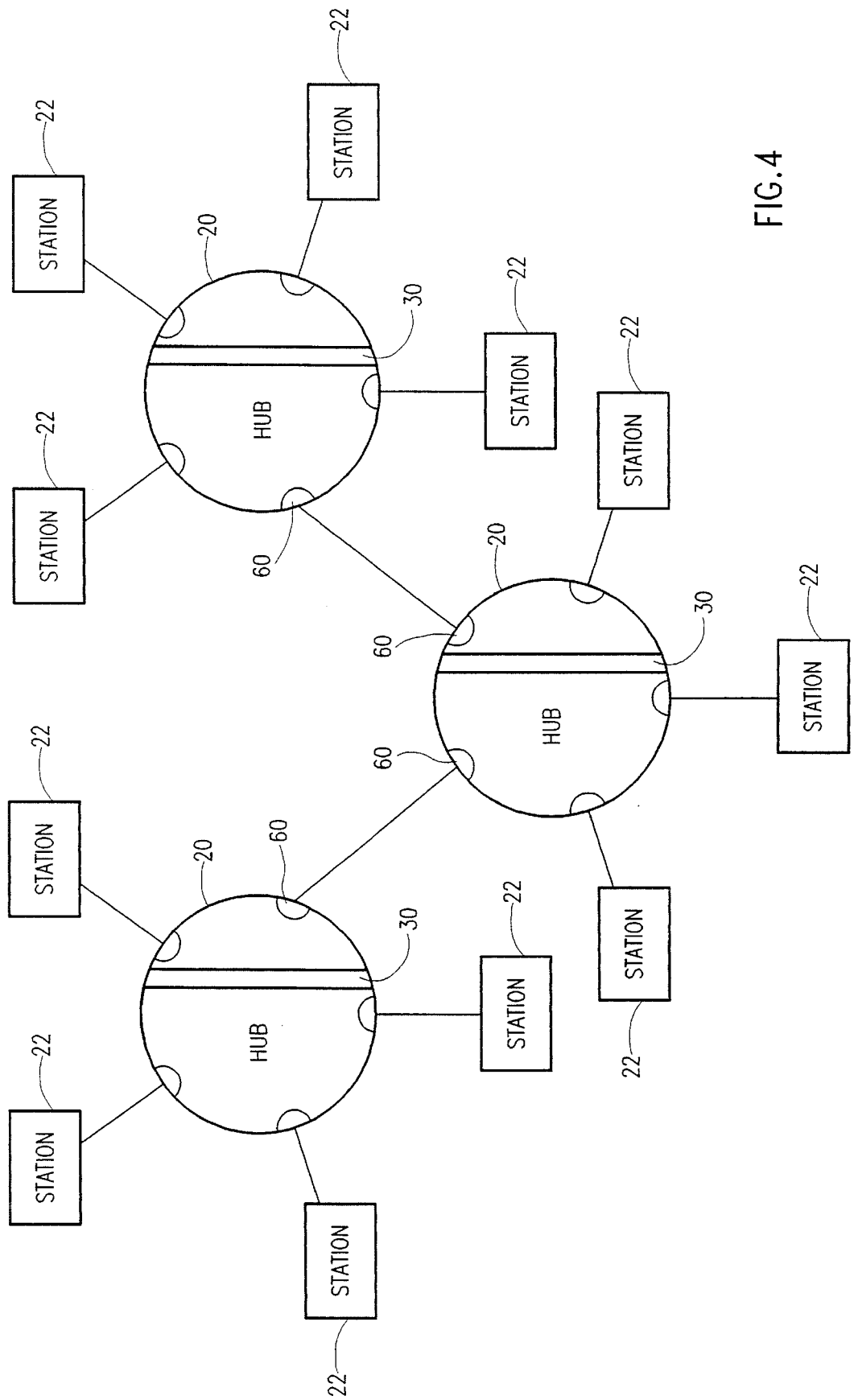
FIG. 4 is a schematic illustration of a collection of hubs connected together to form an extended LAN network.

A LAN having a plurality of hubs 20 (i.e. A LAN with more stations 22 than are controllable by one hub 20) can be maintained secure as described hereinbelow with respect to FIG. 4.

Each hub 20 having a security unit 30 is attached to at least one other hub 20 via a security backbone port 60. Data coming through one of ports 60 is assumed to be secure and therefore, is not checked by the receiving hub 20.

As described hereinabove, each security unit 30 has defined in it a list of the authorized stations connected to it and the authorized destinations of each station. In the embodiment illustrated in FIG. 4, the list of authorized destinations of each station includes stations attached to the other hubs. Thus, the source and destination of any message sent from a first hub is checked and is only sent to the destination hub and station if the source and destination are authorized by the first hub.

It will be appreciated by persons skilled in the art that the present invention is not limited to what has been particularly shown and described hereinabove. Rather the scope of the present invention is defined only by the claims which follow:

We claim:

1. A network having a security capability, the network comprising:

a data bus;

a plurality of stations connected to the data bus; and a security unit which monitors traffic on said data bus and only enables authorized data to flow along said data bus by causing a collision on said data bus when unauthorized traffic is detected.

2. A network according to claim 1 and wherein said data bus and said security unit are part of a hub.

3. A network according to claim 1 and characterized in that said network is a local area network (LAN).

4. A network according to claim 3 and characterized in that said network is a carrier sensing multiple access/collision detection type of LAN.

5. A network according to claim 1 and wherein said security unit comprises a packet blocker operating in accordance with a protocol of said network and operative when unauthorized communication is requested.

6. A network according to claim 1 wherein said traffic comprises a multiplicity of data packets each having source and destination addresses and wherein said security unit comprises a plurality of correlators for determining that said source and destination addresses indicate an authorized communication.

7. A network according to claim 6 wherein each station is connected to said data bus via a port having a port address and wherein one of said correlators correlates said source address with an authorized port address.

8. A method of securing a network having at least one hub, the method comprising:

sending blocks of data on a data bus of said hub, wherein said blocks of data each comprise at least source and destination addresses for every block of data sent on said data bus of said hub, determining if said addresses conform to a stored set of access rules; and causing a collision on the network if the output of said step of determining is false.

9. A method according to claim 8 and wherein said set of access rules includes the rule that said source station address must be among a list of authorized source station addresses.

10. A method according to claim 8 and wherein said set of access rules includes the rule that said source station must be physically connected to an authorized port address.

11. A method according to claim 9 and wherein said set of access rules includes the rule that said source station must be physically connected to an authorized port address.

12. A method according to claim 8 and wherein said set of access rules includes the rule that said destination station address must be in a list of authorized destination station addresses for said source station address.

13. A method according to claim 9 and wherein said set of access rules includes the rule that said destination station address must be in a list of authorized destination station addresses for said source station address.

14. A method according to claim 10 and wherein said set of access rules includes the rule that said destination station address must be in a list of authorized destination station addresses for said source station address.

15. A method according to claim 11 and wherein said set of access rules includes the rule that said destination station address must be in a list of authorized destination station addresses for said source station address.

16. A security unit for a network having a data bus to which a plurality of stations are connected, comprising a traffic monitor which monitors traffic on said data bus and a collision mechanism which only enables authorized data to flow along said data bus by causing a collision on said data bus when unauthorized traffic is detected.

17. A security unit according to claim 16 and wherein said data bus and said security unit are part of a hub.

18. A security unit according to claim 16 and comprising a packet blocker operating in accordance with a protocol of said network and operative when unauthorized communication is requested.

19. A security unit according to claim 16 wherein said traffic comprises a multiplicity of data packets each having source and destination addresses and wherein said security unit comprises a plurality of correlators for determining that said source and destination addresses indicate an authorized communication.

20. A security unit according to claim 19 wherein each station is connected to said data bus via a port having a port address and wherein one of said correlators correlates said source address with an authorized port address.

21. A method of securing a network comprising:

sending blocks of data on a data bus of said network, wherein said blocks of data comprise at least a source address and a port address to which said source is connected;

determining if said source address and said port address conform to a stored set of allowable source address and port address combinations; and denying access to the network for data blocks whose source address and port address do not conform to said stored set of allowable combinations by causing a collision on said data bus.

22. A method of securing a network comprising: sending blocks of data on a data bus of said network;

causing a collision on the network if the blocks do not conform to a stored set of access rules.

* * * * *